United States Patent
Ogiso et al.

(10) Patent No.: US 12,190,849 B2
(45) Date of Patent: Jan. 7, 2025

(54) DISPLAY CONTROL APPARATUS, DISPLAY CONTROL METHOD, AND PROGRAM FOR DISPLAYING AN IMAGE OVERLAYING A TARGET IMAGE IN A SAFE AREA OF A DISPLAY

(71) Applicant: SONY INTERACTIVE ENTERTAINMENT INC., Tokyo (JP)

(72) Inventors: Toru Ogiso, Tokyo (JP); Masato Mitsutake, Tokyo (JP); Sachiyo Aoki, Tokyo (JP); Michiko Matsumura, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/627,135

(22) PCT Filed: Jul. 21, 2020

(86) PCT No.: PCT/JP2020/028299
§ 371 (c)(1),
(2) Date: Jan. 14, 2022

(87) PCT Pub. No.: WO2021/020239
PCT Pub. Date: Feb. 4, 2021

(65) Prior Publication Data
US 2022/0254321 A1 Aug. 11, 2022

(30) Foreign Application Priority Data
Aug. 1, 2019 (JP) .................................. 2019-142374

(51) Int. Cl.
*G09G 5/14* (2006.01)
*A63F 13/52* (2014.01)
(Continued)

(52) U.S. Cl.
CPC ............... *G09G 5/14* (2013.01); *G09G 5/377* (2013.01); *A63F 13/52* (2014.09); *A63F 13/53* (2014.09);
(Continued)

(58) Field of Classification Search
None
See application file for complete search history.

(56) References Cited

U.S. PATENT DOCUMENTS 5,877,741 A * 3/1999 Chee ...................... G09G 5/393
345/629
7,864,203 B1 * 1/2011 Fear ....................... G09G 5/363
345/428
(Continued)

FOREIGN PATENT DOCUMENTS

JP 2004271802 A 9/2004
JP 2005345523 A 12/2005
(Continued)

OTHER PUBLICATIONS

Baker I., 'Safe areas for widescreen transmission', EBU Technical Review, pp. 1-6. (Year: 1999).*
(Continued)

*Primary Examiner* — Matthew Salvucci
(74) *Attorney, Agent, or Firm* — XSENSUS LLP

(57) ABSTRACT

Provided are a display control apparatus, a display control method, and a program that enable developers to implement application programs without needing to be aware of a safe area. An image acquisition section (42) acquires an image that is drawn in a frame buffer by an application program. A safe area setting specification section (44) specifies the setting of a safe area in a display section. An image generation section (48) generates a display target image including, as a part, the image sized according to the setting
(Continued)

of the safe area. A display control section (50) causes the display section to display the display target image.

20 Claims, 9 Drawing Sheets

(51) Int. Cl.
  *A63F 13/53* (2014.01)
  *G09G 5/377* (2006.01)
  *G09G 5/395* (2006.01)
  *G09G 5/397* (2006.01)
(52) U.S. Cl.
  CPC ............ *G09G 5/395* (2013.01); *G09G 5/397* (2013.01); *G09G 2320/0261* (2013.01); *G09G 2340/0464* (2013.01); *G09G 2340/125* (2013.01); *G09G 2360/18* (2013.01)

(56) References Cited

U.S. PATENT DOCUMENTS

| | | | | |
|---|---|---|---|---|
| 2006/0017852 A1* | 1/2006 | Iwaki | ..................... | G09G 5/363 |
| | | | | 348/448 |
| 2006/0071949 A1* | 4/2006 | Sakuma | ............. | G06F 3/04897 |
| | | | | 345/660 |
| 2006/0125848 A1* | 6/2006 | Alcorn | .................. | G06T 15/503 |
| | | | | 348/E13.037 |
| 2007/0097326 A1* | 5/2007 | Yang | ...................... | G03B 21/28 |
| | | | | 353/69 |
| 2010/0066762 A1* | 3/2010 | Yeh | .................... | H04N 5/44504 |
| | | | | 345/629 |
| 2010/0077231 A1* | 3/2010 | Nason | ..................... | G06F 21/82 |
| | | | | 713/193 |
| 2013/0201197 A1* | 8/2013 | Sandmel | ............. | H04N 21/426 |
| | | | | 345/545 |
| 2015/0195604 A1* | 7/2015 | Synowiec | ............. | G06F 1/1601 |
| | | | | 361/679.22 |
| 2016/0156893 A1* | 6/2016 | Bogusz | .................... | H04N 9/75 |
| | | | | 348/587 |

FOREIGN PATENT DOCUMENTS

| | | |
|---|---|---|
| JP | 2006030914 A | 2/2006 |
| JP | 2006107009 A | 4/2006 |
| JP | 2015026034 A | 2/2015 |
| JP | 2015515658 A | 5/2015 |
| JP | 2017188833 A | 10/2017 |

OTHER PUBLICATIONS

International Search Report and Written Opinion mailed Sep. 29, 2020, from PCT/JP2020/028299, 8 sheets.
Notice of Reasons for Refusal dated Dec. 13, 2022, from Japanese Application No. 2021-536975, 5 sheets.

* cited by examiner

… (1) …

DISPLAY CONTROL APPARATUS, DISPLAY CONTROL METHOD, AND PROGRAM FOR DISPLAYING AN IMAGE OVERLAYING A TARGET IMAGE IN A SAFE AREA OF A DISPLAY

TECHNICAL FIELD

The present invention relates to a display control apparatus, a display control method, and a program.

BACKGROUND ART

Due to overscan, common displays, such as TV sets, occasionally fail to display edges of a display target image. Therefore, developers of an application program, such as a game, need to be aware of a safe area when implementing the application program so as to ensure that information to be displayed in the safe area is displayed even if overscan occurs. Further, as a size of the safe area varies from one display to another, it is difficult to achieve implementation for displaying proper images on all displays by considering the application program alone.

SUMMARY

Technical Problem

However, it is problematic to perform implementation while being aware of the safe area.

The present invention has been made in view of the above circumstances. An object of the present invention is to provide a display control apparatus, a display control method, and a program that enable the developers to implement application programs without needing to be aware of the safe area.

Solution to Problem

In order to solve the above problem, a display control apparatus according to the present invention includes an image acquisition section, a specification section, an image generation section, and a display control section. The image acquisition section acquires an image that is drawn in a frame buffer by an application program. The specification section specifies setting of a safe area in a display section. The image generation section generates a display target image that includes, as a part, the image sized according to the setting. The display control section causes the display section to display the display target image.

According to an aspect of the present invention, the image generation section generates the display target image that is obtained by superimposing a first image and a second image. The first image is sized according to the setting and drawn in a first frame buffer. The second image is drawn in a second frame buffer.

According to another aspect of the present invention, the image generation section exercises control in accordance with an instruction received from the application program so as to determine whether or not to generate the display target image including, as a part, the image sized according to the setting.

According to yet another aspect of the present invention, the image generation section exercises control in accordance with the received instruction so as to determine whether or not to generate the display target image including, as a part, the image sized according to the setting. The image generation section generates the display target image that is obtained by superimposing a first image and a second image. The first image is based on an image that is drawn in a first frame buffer by a first application program. The second image is based on an image that is drawn in a second frame buffer by a second application program. Irrespective of whether or not to generate the display target image including, as a part, the image sized according to the setting, the image generation section places the first image having a given size at a given position in the display target image. Depending on whether or not to generate the display target image including, as a part, the image sized according to the setting, the image generation section changes a region where pixels of the first image in the display target image are reflected.

A display control method according to the present invention includes the steps of acquiring an image that is drawn in a frame buffer by an application program, specifying setting of a safe area in a display section, generating a display target image that includes, as a part, the image sized according to the setting, and causing the display section to display the display target image.

A program according to the present invention causes a computer to execute procedures for acquiring an image that is drawn in a frame buffer by an application program, specifying setting of a safe area in a display section, generating a display target image that includes, as a part, the image sized according to the setting; and causing the display section to display the display target image.

DESCRIPTION OF EMBODIMENT

An embodiment of the present invention will now be described with reference to the accompanying drawings.

Figure 1:
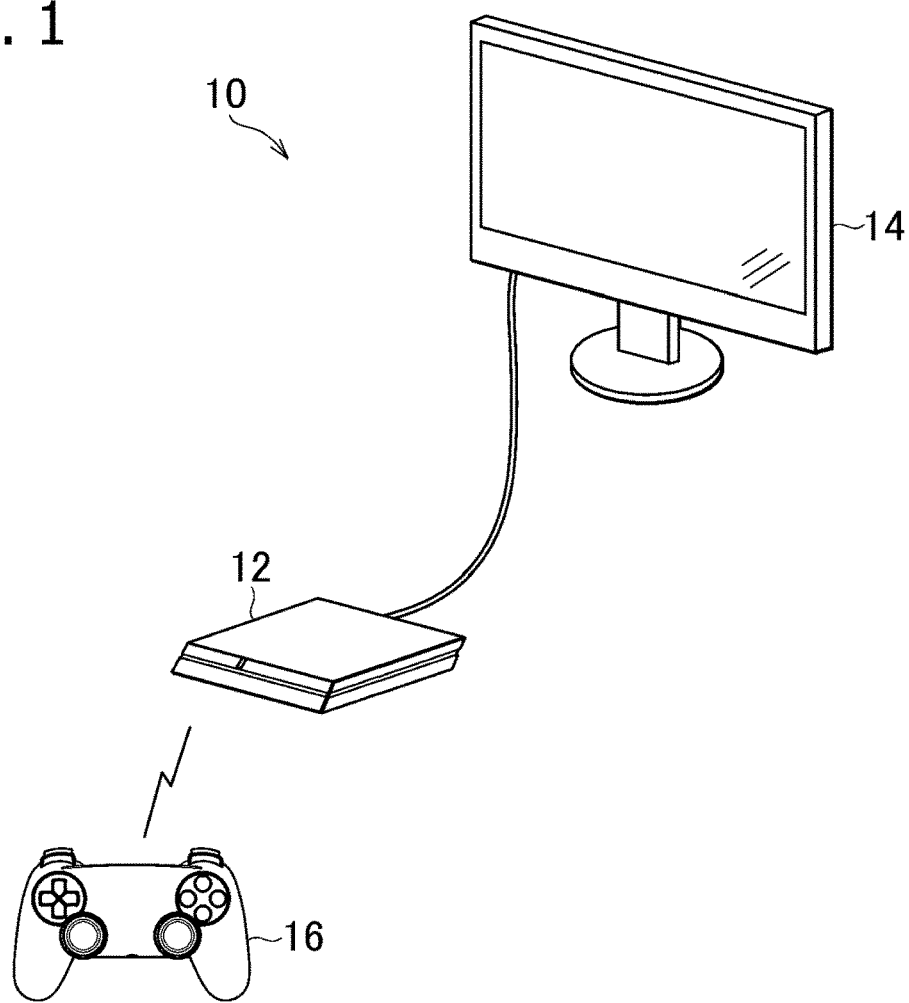
FIG. 1 is a diagram illustrating an example configuration of an entertainment system according to an embodiment of the present invention.
Figure 2:
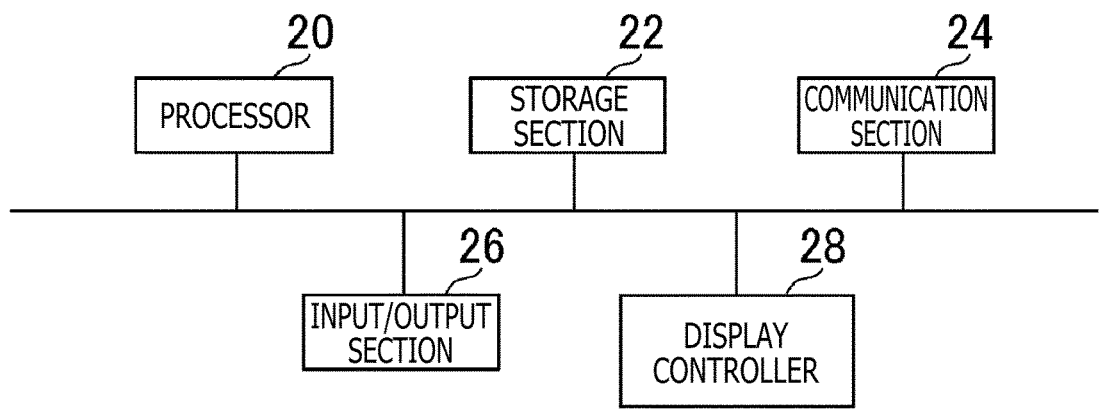
FIG. 2 is a diagram illustrating an example configuration of an entertainment apparatus according to the embodiment of the present invention.

FIG. 1 is a diagram illustrating an example configuration of an entertainment system 10 according to an embodiment of the present invention. FIG. 2 is a diagram illustrating an example configuration of an entertainment apparatus 12 according to the present embodiment.

As depicted in FIG. 1, the entertainment system 10 according to the present embodiment includes the entertainment apparatus 12, a display 14, and a controller 16.

The entertainment apparatus 12 according to the present embodiment is a computer such as a game console, a DVD (Digital Versatile Disc) player, or a Blu-ray (registered trademark) player. The entertainment apparatus 12 according to the present embodiment generates a video or a sound, for example, by executing a game program or reproducing content in a situation where the game program or the content is stored or recorded on an optical disk. Further, the entertainment apparatus 12 according to the present embodiment outputs, to the display 14, a video signal representing the video to be generated and an audio signal representing the sound to be generated.

As depicted, for example, in FIG. 2, the entertainment apparatus 12 according to the present embodiment includes a processor 20, a storage section 22, a communication section 24, an input/output section 26, and a display controller 28.

The processor 20 is, for example, a CPU (Central Processing Unit) or other program control device that operates in accordance with a program installed in the entertainment apparatus 12. The processor 20 according to the present embodiment includes a GPU (Graphics Processing Unit) that draws an image in a frame buffer in accordance with a graphics command and data supplied from the CPU.

The storage section 22 is, for example, a ROM (Read Only Memory), a RAM (Random Access Memory), or other storage element or a hard disk drive. The storage section 22 stores, for example, a program to be executed by the processor 20. Further, the storage section 22 according to the present embodiment is provided with a region of the frame buffer in which an image is drawn by the GPU.

The communication section 24 is, for example, a communication interface such as a wireless LAN (Local Area Network) module.

The input/output section 26 is an input/output port such as an HDMI (High-Definition Multimedia Interface) (registered trademark) port or a USB (Universal Serial Bus) port.

The display controller 28 is a hardware device that, for example, performs image scaling, makes image quality adjustments such as image color conversion, and combines images.

The display 14 according to the present embodiment is, for example, a display section of a liquid-crystal display, and used to display, for instance, a video represented by a video signal outputted from the entertainment apparatus 12. Further, the display 14 according to the present embodiment includes a speaker. The speaker outputs a sound represented by an audio signal outputted from the entertainment apparatus 12.

The entertainment apparatus 12 and the display 14 are connected, for example, through an HDMI cable.

The controller 16 according to the present embodiment is an operation input apparatus that is used to perform an operation input to the entertainment apparatus 12. The controller 16 enables a user to perform various operation inputs by pressing a direction key or button on the controller 16 or by tilting an operation stick on the controller 16. Subsequently, in the present embodiment, the controller 16 outputs, to the entertainment apparatus 12, input data corresponding to an operation input. Further, the controller 16 according to the present embodiment includes a USB port. Consequently, when connected to the entertainment apparatus 12 through an USB cable, the controller 16 is able to wirelessly output the input data to the entertainment apparatus 12. Furthermore, the controller 16 according to the present embodiment is provided, for example, with a wireless communication module and able to wirelessly output the input data to the entertainment apparatus 12.

In the present embodiment, when, for example, an application program is executed by the entertainment apparatus 12 included in the entertainment system 10, a video is generated according to the status of application program execution. For example, upon executing a game program, the entertainment apparatus 12 generates a video representing the status of a game play.

Figure 3:
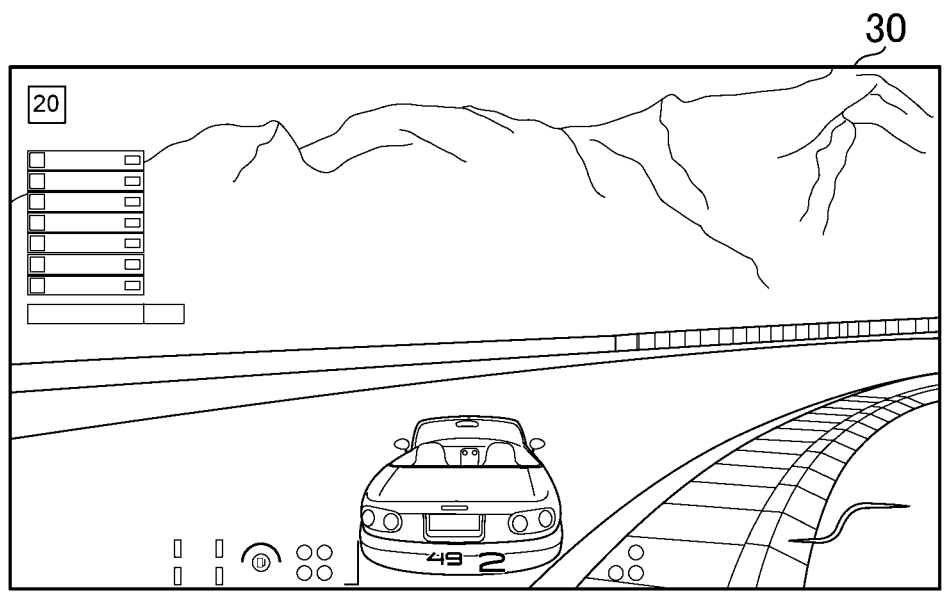
FIG. 3 is a diagram illustrating an example of a drawn image.

FIG. 3 is a diagram illustrating an example of a drawn image 30 that corresponds to a frame image included in a video generated by the entertainment apparatus 12. In the present embodiment, the drawn image 30 is generated when, for example, the processor 20 executes a game program or other application program. The generated drawn image 30 is then stored in the region of the frame buffer provided in the storage section 22.

Subsequently, in the present embodiment, the display controller 28 accesses the frame buffer to read the drawn image 30 stored in the frame buffer and generates a display target image 32 illustrated in FIG. 4 according to the read drawn image 30.

Figure 4:
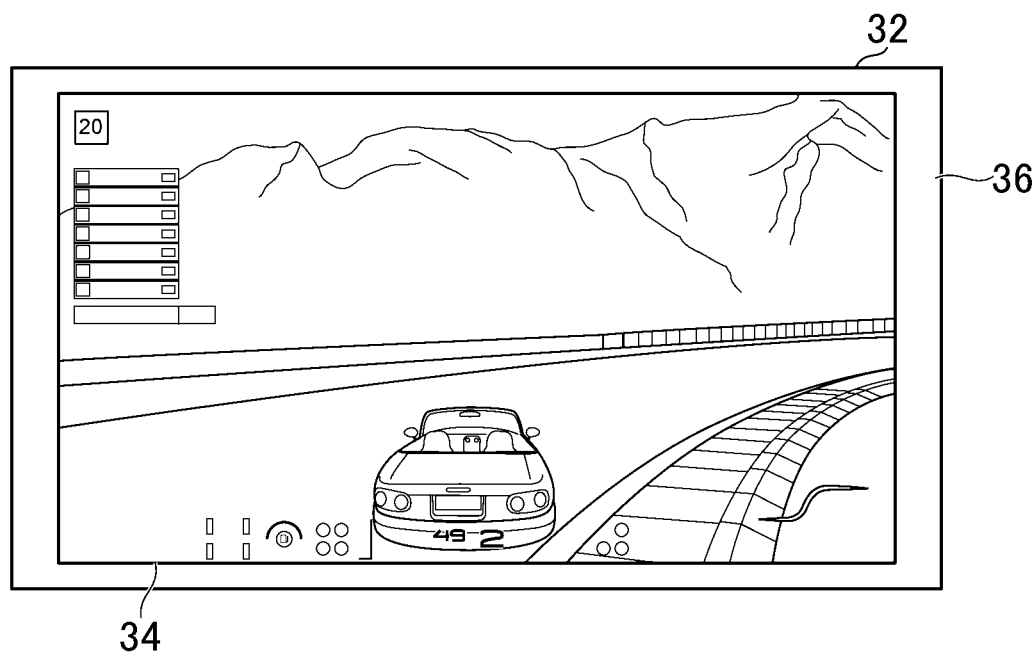
FIG. 4 is a diagram illustrating an example of a display target image.

A display region 34 corresponding to a safe area is depicted in the display target image 32 illustrated in FIG. 4. The safe area is set in the display 14. In the present embodiment, for example, the display controller 28 not only resizes the drawn image 30 as needed to place it in the display region 34, but also generates the display target image 32 by placing pixels having a predetermined color, such as black, in a non-display-target region 36 that is a sash-shaped region outside the display region 34. It should be noted that the drawn image 30 may alternatively be placed in the display region 34 without being resized.

Subsequently, the display controller 28 outputs the display target image 32 to the display 14 through the input/output section 26.

When, for example, an attempt is made to display the drawn image 30 depicted in FIG. 3 on the display 14, the edges of the drawn image 30 may be positioned outside the visible region of the display 14 depending on the size of the safe area of the display 14. In reality, the display 14 may display, for example, only a part of the drawn image 30, namely, an actual display image.

In the present embodiment, the display target image 32 generated based on the drawn image 30 appears on the display 14. Therefore, even if overscan occurs to display only the actual display image, which is a part of the display target image 32 and placed in the display region 34, the display 14 displays the whole content of the drawn image 30. A process of generating the display target image 32 depicted in FIG. 4 is hereinafter referred to as the autoscaling process.

Functions of the entertainment apparatus 12 and processes performed by the entertainment apparatus 12 will now be further described by mainly explaining about the autoscaling process.

Figure 5:
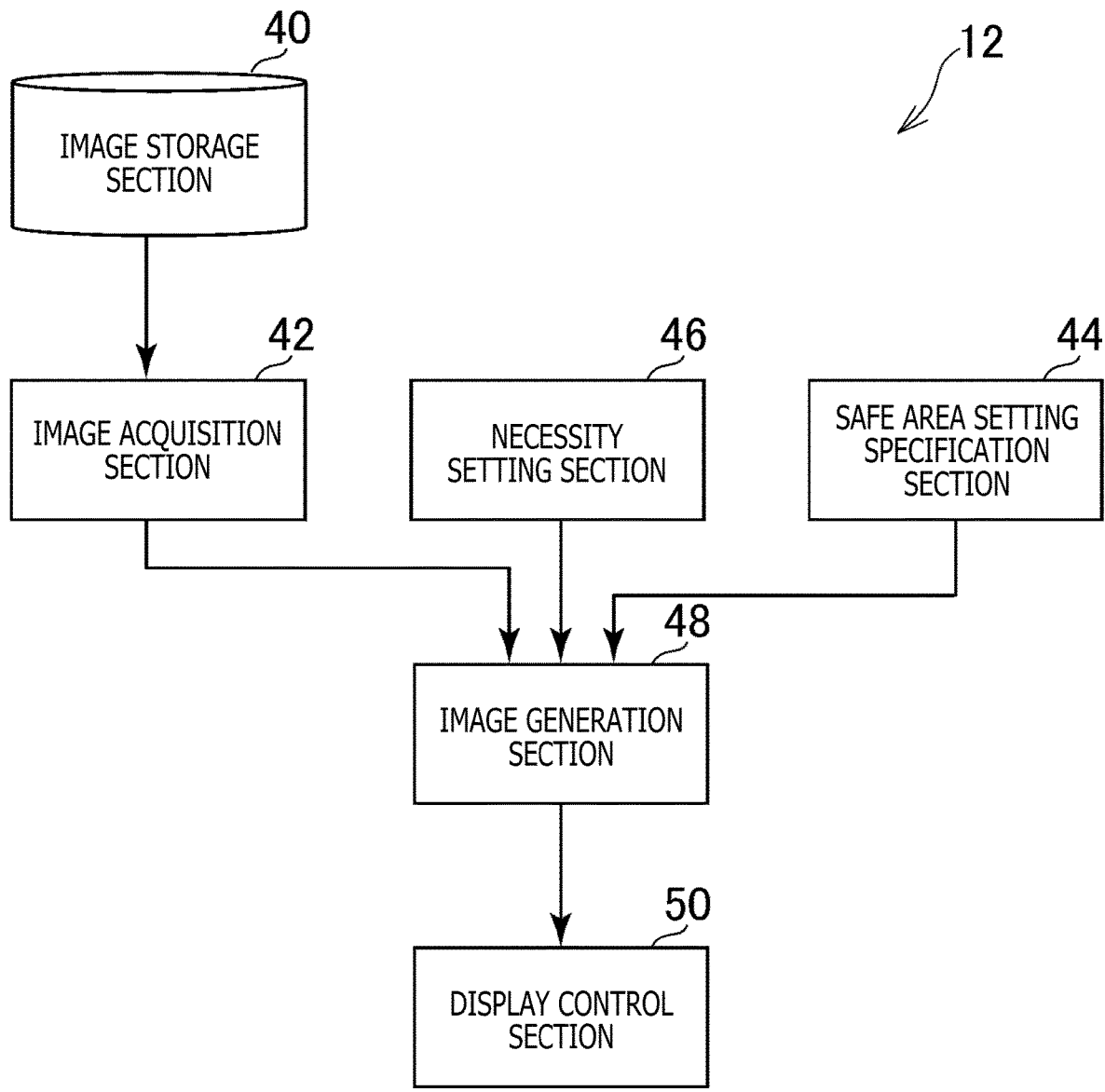
FIG. 5 is a functional block diagram illustrating example functions of the entertainment apparatus according to the embodiment of the present invention.

FIG. 5 is a functional block diagram illustrating example functions implemented by the entertainment apparatus 12 according to the present embodiment. It should be noted that the entertainment apparatus 12 according to the present embodiment does not need to implement all of the functions depicted in FIG. 5, and may implement functions other than those depicted in FIG. 5.

As depicted in FIG. 5, the entertainment apparatus 12 functionally includes, for example, an image storage section 40, an image acquisition section 42, a safe area setting specification section 44, a necessity setting section 46, an image generation section 48, and a display control section 50. The image storage section 40 is implemented mainly by the storage section 22. The image acquisition section 42, the safe area setting specification section 44, and the image generation section 48 are implemented mainly by the display controller 28. The necessity setting section 46 is implemented mainly by the processor 20 and the storage section 22. The display control section 50 is implemented mainly by the storage section 22, the input/output section 26, and the display controller 28.

The above functions may be implemented by allowing the processor 20 or the display controller 28 to execute a program that is installed in the entertainment apparatus 12, which is a computer, and includes commands corresponding to the above functions. The program may be supplied to the entertainment apparatus 12 through the Internet or through a computer-readable information storage medium, such as an optical disk, a magnetic disk, a magnetic tape, a magneto-optical disk, or a flash memory.

In the present embodiment, the image storage section 40 stores, for example, the drawn image 30. An image stored in the region of the frame buffer provided in the storage section 22 corresponds to the drawn image 30 to be stored in the image storage section 40. Here, it is assumed that when, for example, the processor 20 executes an application program, a new drawn image 30 is recorded at a predetermined frame rate in the frame buffer included in the image storage section 40.

In the present embodiment, the image acquisition section 42 acquires, for example, the drawn image 30 stored in the image storage section 40. In this instance, the image acquisition section 42 acquires, for example, the drawn image 30 stored in the frame buffer.

In the present embodiment, the safe area setting specification section 44 specifies, for example, the setting of a safe area in the display 14. The safe area setting specification section 44 may specify, for example, the setting of the size of the safe area that is to be set based on a user operation. Further, the safe area setting specification section 44 may specify the setting of the size of the safe area, for example, in accordance with display specifications or other information (e.g., EDID (Extended Display Identification DATA)) acquirable from the display 14.

For example, the percentage of an image to be actually displayed on the display 14 relative to the whole image generated by the later-described image generation section 48 may be indicated by the setting of the safe area that is specified by the safe area setting specification section 44.

In the above instance, for example, when no overscan occurs and the whole image generated by the image generation section 48 appears on the display 14, the percentage indicated by the safe area setting is 100%. Meanwhile, when the width and height around the center of the image to be displayed on the display 14 are both 90% of those of the image generated by the image generation section 48, the percentage indicated by the safe area setting is 90%.

In the present embodiment, the necessity setting section 46 stores, for example, necessity data that indicates whether or not the autoscaling process is necessary. In this instance, if, for example, the value of the necessity data is 1, the autoscaling process will be performed. If the value of the necessity data is 0, the autoscaling process will not be performed.

Further, in the present embodiment, the necessity setting section 46 sets, for example, the value of the necessity data, which is stored in the necessity setting section 46, in accordance with a setting instruction about autoscaling process necessity, which is received from the application program. For example, upon receiving, from the application program, the setting instruction indicating that autoscaling is necessary, the necessity setting section 46 sets the value of the necessity data stored in the necessity setting section 46 to 1. Meanwhile, upon receiving, from the application program, the setting instruction indicating that autoscaling is not necessary, the necessity setting section 46 sets the value of the necessity data stored in the necessity setting section 46 to 0.

In the present embodiment, the image generation section 48 generates, for example, the display target image 32 that includes, as a part, the drawn image 30 sized according to the safe area setting specified by the safe area setting specification section 44.

For example, the image generation section 48 specifies the size of the display region 34 according to the safe area setting specified by the safe area setting specification section 44. Then, the image generation section 48 generates the display target image 32. The generated display target image 32 is obtained by placing the drawn image 30 acquired by the image acquisition section 42 in the display region 34 having the same center position as the display target image 32. In the above instance, for example, the image generation section 48 may alternatively generate the display target image 32 by resizing the drawn image 30 as needed to place it in the display region 34 and placing pixels having a predetermined color, such as black, in the non-display-target region 36, which is a sash-shaped region outside the display region 34. It should be noted that the drawn image 30 may alternatively be placed in the display region 34 without being resized. When, for example, the percentage indicated by the safe area setting is 90%, the image generation section 48 may place, in the display region 34, the drawn image 30 that is resized to 90% of both the width and height of the display target image 32.

Further, based on an instruction received from the application program by the necessity setting section 46, the image generation section 48 exercises control so as to determine whether or not to generate the display target image 32 including, as a part, the drawn image 30 sized according to the safe area setting. For example, when the value of the necessity data stored in the necessity setting section 46 is 1, the image generation section 48 performs the autoscaling process. Meanwhile, when the value of the necessity data stored in the necessity setting section 46 is 0, the image generation section 48 does not perform the autoscaling process.

In the present embodiment, the display control section 50 displays, for example, the display target image 32 on the display 14.

When, for example, the value of the necessity data stored in the necessity setting section 46 is 1, the present embodiment performs the autoscaling process as described above. If, in this instance, the percentage indicated by the safe area setting is 100%, the display 14 displays the whole of the display target image 32. Meanwhile, if the percentage indicated by the safe area setting is less than 100%, overscan occurs, and the display 14 displays the actual display image, which is a part of the display target image 32. For example, the display 14 displays only a portion placed in the display region 34 that is included in the display target image 32 illustrated in FIG. 4.

Further, when, for example, the value of the necessity data stored in the necessity setting section 46 is 0 as mentioned above, the present embodiment does not perform the autoscaling process. In this case, the display 14 displays the whole of the drawn image 30 as the display target image 32.

Figure 6:
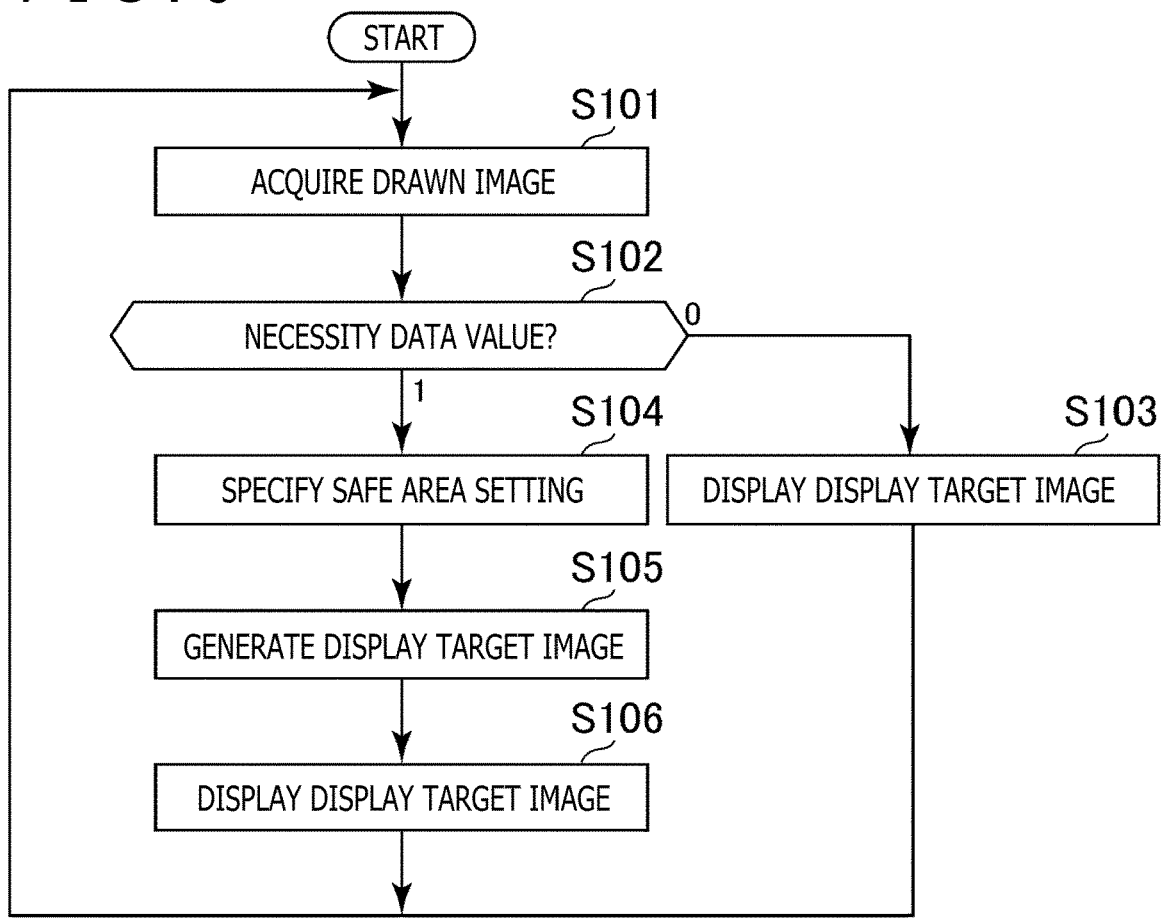
FIG. 6 is a flowchart illustrating an example flow of processing performed by the entertainment apparatus according to the embodiment of the present invention.

An example flow of processing repeatedly performed at a predetermined frame rate by the entertainment apparatus 12 according to the present embodiment will now be described with reference to the flowchart depicted in FIG. 6.

First of all, the image acquisition section 42 acquires the drawn image 30 in a specific frame that is stored in the image storage section 40 (step S101).

Subsequently, the safe area setting specification section 44 confirms the value of the necessity data stored in the necessity setting section 46 (step 102).

In a case where the value of the necessity data is 0, the image generation section 48 causes the display 14 to display the drawn image 30 acquired in step S101 as the display target image 32 (step S103). Upon completion of step S103, processing returns to step S101. In this case, the display target image 32 is identical with the drawn image 30.

Meanwhile, in a case where the value of the necessity data is 1, the safe area setting specification section 44 specifies the safe area setting (step S104).

Subsequently, the image generation section 48 generates the display target image 32 that includes, as a part, the drawn image 30 that is resized according to the safe area setting specified in step S104 (step S105).

Next, the display control section 50 causes the display 14 to display the display target image 32 generated in step S105 (step S106). Upon completion of step S106, processing returns to step S101. In a case where overscan occurs, step S106 is performed to allow the display 14 to display only a part of the display target image 32 generated in step S105.

In the above example of processing, steps S101 to S106 are repeatedly performed at the predetermined frame rate.

According to the present embodiment, developers of application programs, such as game programs, are able to implement the application program without needing to be aware of the safe area.

Further, for example, some game scenes require the autoscaling process to be performed, while other game scenes do not require the autoscaling process to be performed. Based on such circumstances, the present embodiment is configured to enable the developers of application programs to exercise control so as to determine whether or not to perform the autoscaling process as mentioned above in accordance, for example, with the game scenes.

In the present embodiment, the image storage section 40 may be provided with regions of a plurality of frame buffers, and each of the frame buffers may store an image.

Figure 7:
FIG. 7 is a diagram illustrating an example of the drawn image.
Figure 8:
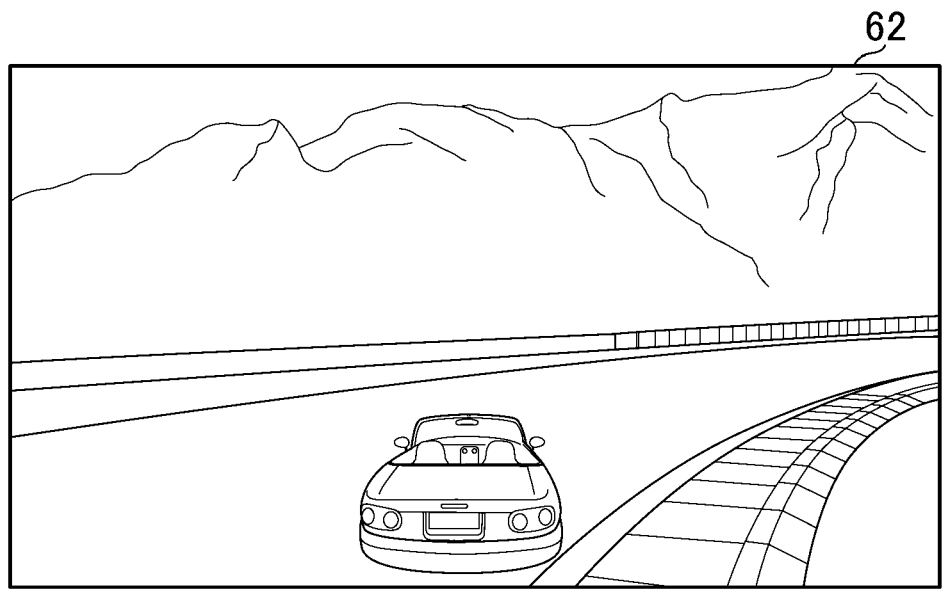
FIG. 8 is a diagram illustrating an example of the drawn image.

FIG. 7 is a diagram illustrating an example of a drawn image 60 that corresponds to a frame image stored in a first frame buffer included in the image storage section 40. FIG. 8 is a diagram illustrating an example of a drawn image 62 that corresponds to a frame image stored in a second frame buffer included in the image storage section 40.

The drawn image 60 depicted in FIG. 7 is a frame image that represents information regarding a user interface for a game, such as the description of input operations in the game and the information about the status of a character. As depicted in FIG. 7, the drawn image 60 may depict, for example, two-dimensional objects such as text, graphics, or symbols. In this instance, for example, an alpha value may be set for each pixel included in the drawn image 60.

The drawn image 62 depicted in FIG. 8 is, for example, a three-dimensional graphic frame image that is indicative of the play status of a game and obtained when a three-dimensional virtual object, such as a game object placed in a three-dimensional virtual space, is viewed from a point of view in the three-dimensional virtual space.

In the above instance, when, for example, the processor 20 executes an application program, the first frame buffer may store a new drawn image 60 at a predetermined frame rate, and the second frame buffer may store a new drawn image 62 at the predetermined frame rate.

Subsequently, the image acquisition section 42 may, in step S101, acquire the drawn image 60 stored in the first frame buffer and the drawn image 62 stored in the second frame buffer.

In the above case, the necessity setting section 46 may store, for each of the frame buffers, the necessity data that indicates the necessity of the autoscaling process. For example, the necessity setting section 46 may store the necessity data about the first frame buffer and the necessity data about the second frame buffer.

Further, as mentioned earlier, the necessity setting section 46 may set the value of the necessity data stored in the necessity setting section 46 in accordance with the setting instruction about autoscaling process necessity, which is received from the application program.

For example, upon receiving, from the application program, the setting instruction indicating that autoscaling is necessary for the first frame buffer, the necessity setting section 46 may set a value of 1 for the necessity data about the first frame buffer, which is stored in the necessity setting section 46. Further, for example, upon receiving, from the application program, the setting instruction indicating that autoscaling is necessary for the second frame buffer, the necessity setting section 46 may set a value of 1 for the necessity data about the second frame buffer, which is stored in the necessity setting section 46.

Furthermore, for example, upon receiving, from the application program, the setting instruction indicating that autoscaling is not necessary for the first frame buffer, the necessity setting section 46 may set a value of 0 for the necessity data about the first frame buffer, which is stored in the necessity setting section 46. Moreover, for example, upon receiving, from the application program, the setting instruction indicating that autoscaling is not necessary for the second frame buffer, the necessity setting section 46 may set a value of 0 for the necessity data about the second frame buffer, which is stored in the necessity setting section 46.

Subsequently, based on the instruction received from the application program by the necessity setting section 46, the image generation section 48 may exercise control so as to determine whether or not to perform the autoscaling process for each of the frame buffers.

Figure 9:
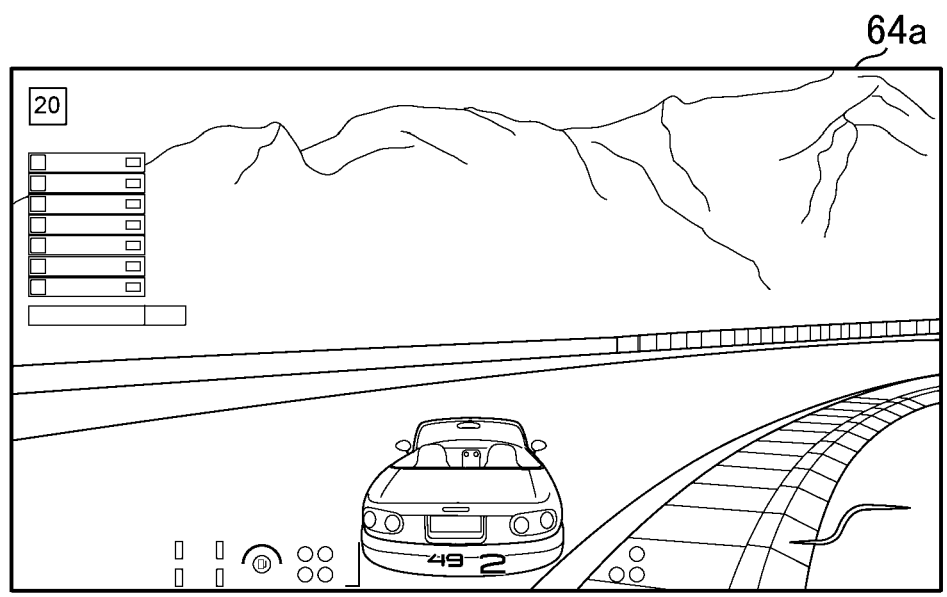
FIG. 9 is a diagram illustrating an example of the display target image.

Here, let us assume, for example, that the value of the necessity data about the first frame buffer and the value of the necessity data about the second frame buffer are both 0. In this case, the image generation section 48 may generate a display target image 64a depicted in FIG. 9. The display target image 64a is obtained by superimposing the drawn image 60 acquired from the first frame buffer and the drawn image 62 acquired from the second frame buffer. The display target image 64a may be generated, for example, by performing an alpha blending process based on the drawn image 60, the alpha value set for each pixel included in the drawn image 60, and the drawn image 62. Then, the display control section 50 may cause the display 14 to display the display target image 64a that is generated in the above manner.

Further, let us assume, for example, that the value of the necessity data about the first frame buffer is 1 while the value of the necessity data about the second frame buffer is 0. In this case, the image generation section 48 may generate a display target image 64b depicted in FIG. 10. The display target image 64b is obtained by superimposing the drawn image 60 sized to the safe area setting and the drawn image 62. The display target image 64b may be generated, for example, by performing the alpha blending process based on the drawn image 60, the alpha value set for each pixel included in the drawn image 60, and the drawn image 62.

Figure 10:
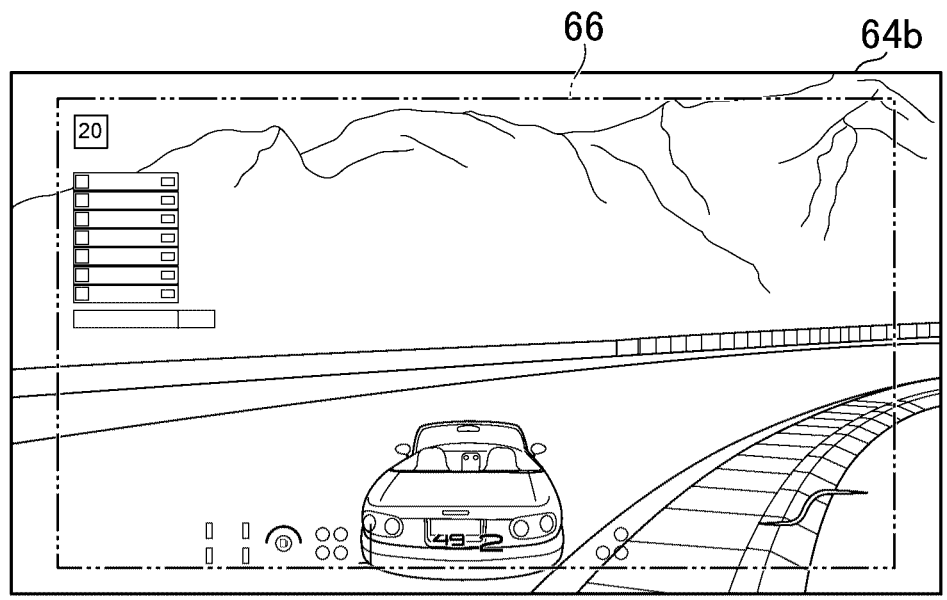
FIG. 10 is a diagram illustrating an example of the display target image.

In the above instance, the image generation section 48 may resize the drawn image 60 acquired from the first frame buffer and place the resized drawn image 60 in a display region 66. Then, the image generation section 48 may generate the display target image 64b that is obtained, for example, by placing the resized drawn image 60 at the center of the display target image 64b. As depicted in FIG. 10, the drawn image 60 may be placed in the display target image 64b and fitted in the display region 66 specified based on the safe area setting.

Subsequently, the display control section 50 may cause the display 14 to display the display target image 64b that is generated in the above manner. In a case where overscan occurs in this instance, the display 14 displays only a part of the display target image 64b generated in the above manner.

Even if overscan occurs, performing the above-described processing properly displays the information regarding the user interface for a game, which represents two-dimensional objects such as text, graphics, or symbols. Meanwhile, three-dimensional graphics can be prevented from deteriorating in image equality because they are not subjected to a scaling process.

Additionally, the present embodiment may be applied to picture-in-picture (PinP) display.

Figure 11:
FIG. 11 is a diagram illustrating an example of an upper image.

FIG. 11 is a diagram illustrating an example of an upper image 70. The upper image 70 depicted in FIG. 11 is, for example, an image depicting a background in PinP display.

Figure 12:
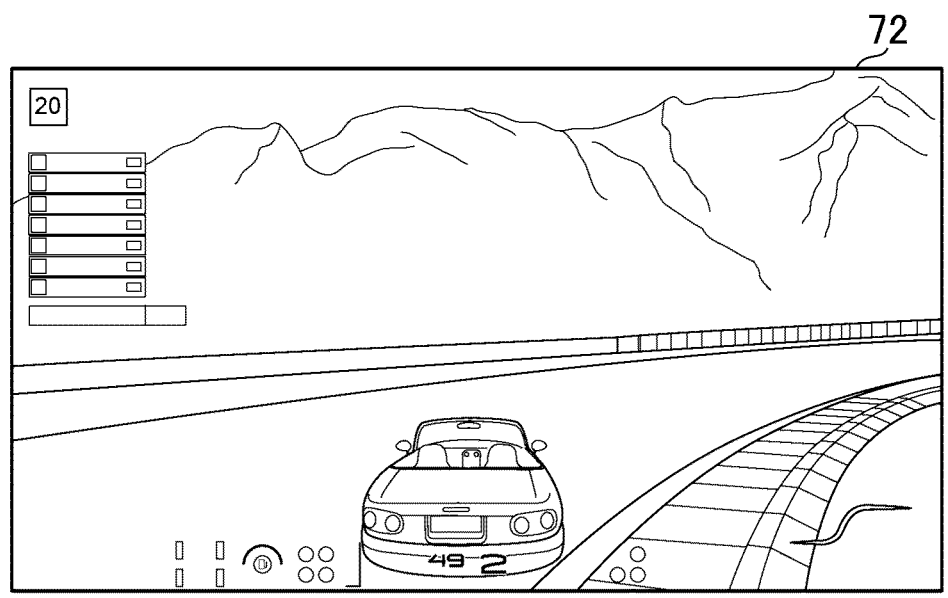
FIG. 12 is a diagram illustrating an example of a lower image.

FIG. 12 is a diagram illustrating an example of a lower image 72. The lower image 72 depicted in FIG. 12 is, for example, an image depicting content to be embedded in the background in PinP display. Here, it is assumed that the lower image 72 depicted in FIG. 12 is identical with the drawn image depicted in FIG. 3.

For example, when the processor 20 executes a first application program, the lower image 72, which is a new frame image, is drawn in the first frame buffer at a predetermined frame rate. Further, when, for example, the processor 20 executes a second application program, the upper image 70, which is a new frame image, is drawn in the second frame buffer at a predetermined frame rate.

Figure 13:
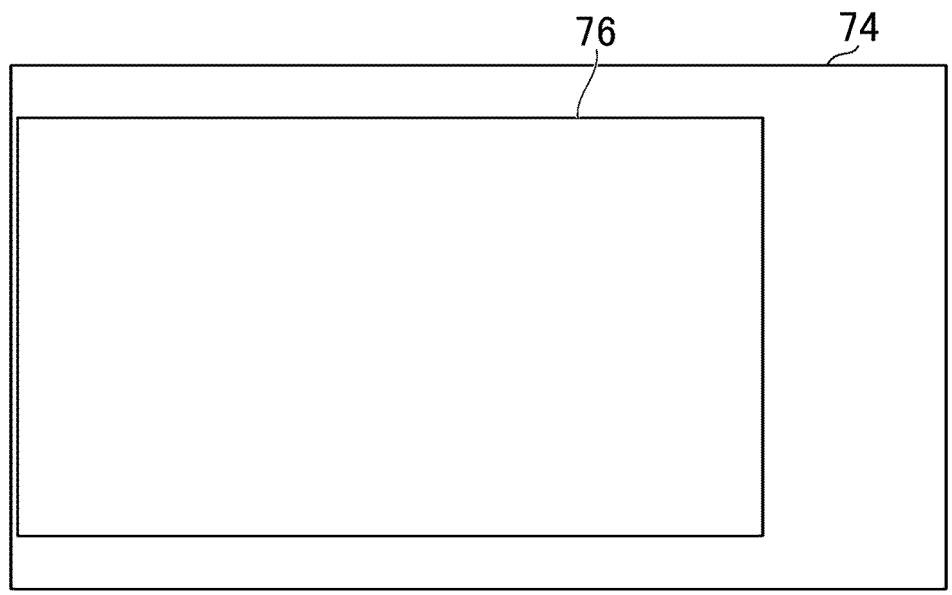
FIG. 13 is a diagram schematically illustrating an example of a placement region.

Moreover, the image storage section 40 stores layout data indicative of position and size in a display target image 74 in which the lower image 72 is placed. FIG. 13 is a diagram schematically illustrating an example of a placement region 76 that is specified, based on the layout data, as the region where the lower image 72 is placed. In the example of FIG. 13, the width and height of the placement region 76 are both 80% of those of the display target image 74.

In the above case, the image acquisition section 42 may acquire the upper image 70 stored in the second frame buffer and the lower image 72 stored in the first frame buffer. Here, it is assumed that the upper image 70 depicted in FIG. 11 is acquired from the second frame buffer, and that the lower image 72 depicted in FIG. 12 is acquired from the first frame buffer.

Figure 14:
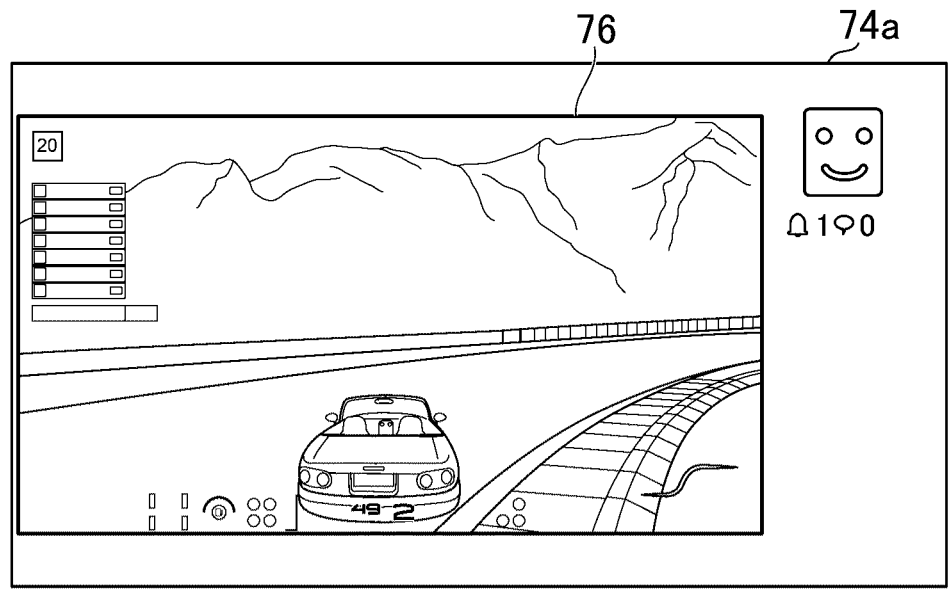
FIG. 14 is a diagram illustrating an example of the display target image.

Here, if the autoscaling process is not performed in the above instance, a display target image 74a illustrated in FIG. 14 may be generated. In this case, for example, a resized lower image 72 may be placed in the placement region 76. Further, the display 14 may subsequently display the display target image 74a generated in the above manner.

In the above instance, the display target image 74a may be generated, for example, by performing the alpha blending process based on the upper image 70, the alpha value determined based on the layout data, and the lower image 72.

Figure 15:
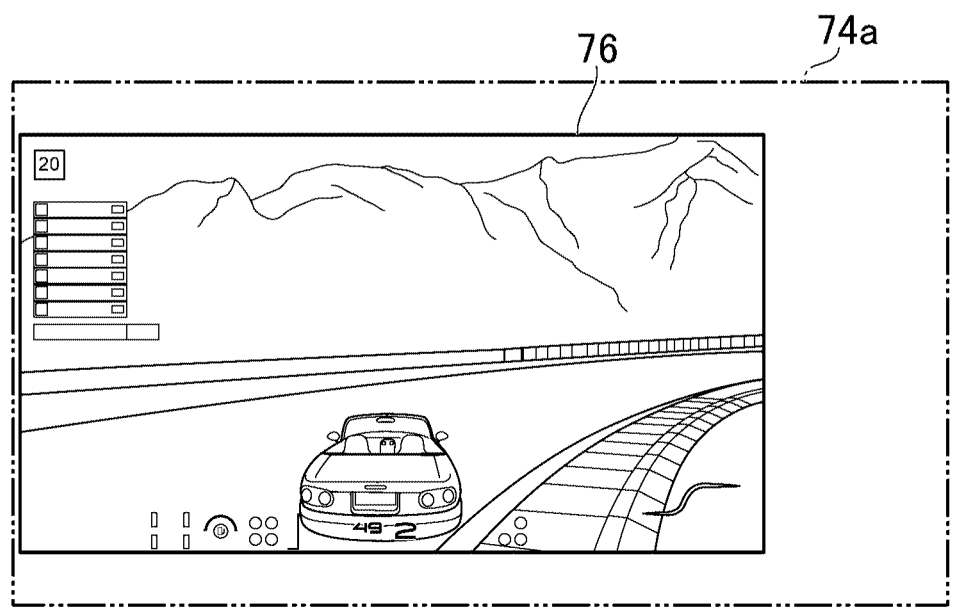
FIG. 15 is a diagram schematically illustrating an example placement of the lower image in the display target image.

FIG. 15 is a diagram schematically illustrating an example placement of the lower image 72 in the display target image 74a. As depicted in FIG. 15, the lower image 72 may be placed in the placement region 76 in a case where the autoscaling process is not performed. Further, the display target image 74a may be generated by performing the alpha blending process while the alpha value of the upper image 70 in the placement region 76 is 0 and the alpha value of the upper image 70 outside the placement region 76 is 1. In this instance, it is assumed that the alpha value 0 represents a transparent upper image 70, whereas the alpha value 1 represents an opaque upper image 70.

Figure 16:
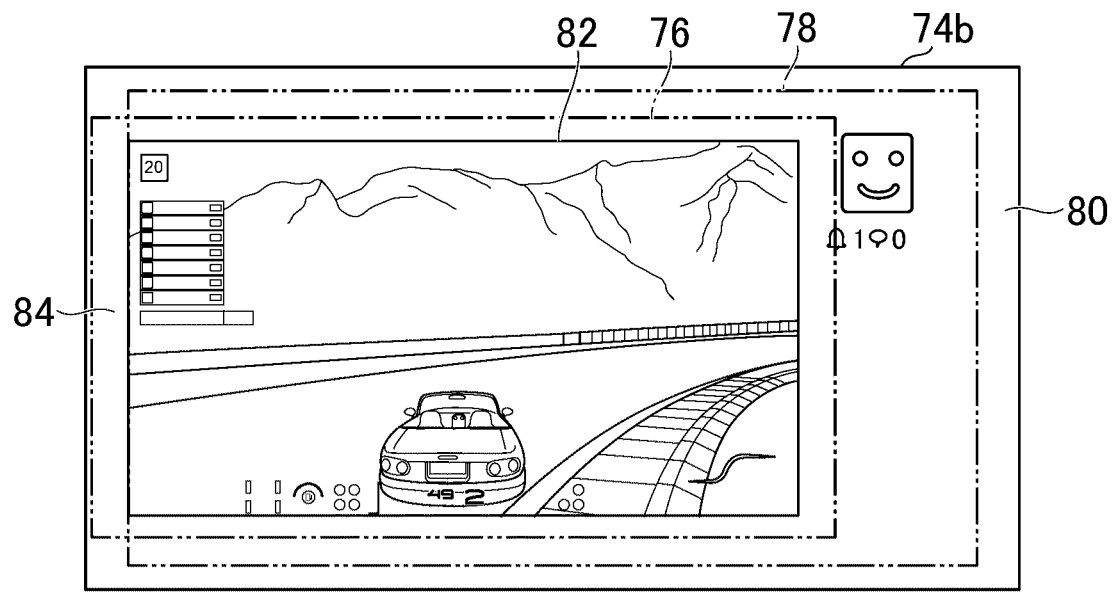
FIG. 16 is a diagram illustrating an example of the display target image.

Meanwhile, in a case where the autoscaling process is performed, a display target image 74b illustrated in FIG. 16 may be generated. Further, the display target image 74b generated in this manner may be displayed on the display 14. If overscan occurs in this case, the display 14 displays only a part of the display target image 74b.

In the above instance, for example, the image generation section 48 may generate the display target image 74b by placing the upper image 70 in a display region 78 and placing pixels having a predetermined color, such as black, in a non-display-target region 80, which is a sash-shaped region outside the display region 78. If the percentage indicated by the safe area setting is 90% in the above instance, the display region 78 is set to have the same center position as the display target image 74b and sized to 90% of both the width and height of the display target image 74b.

Further, for example, the display target image 74b may be generated in the display region 78 by performing the alpha blending process based on the upper image 70, the alpha value determined based on the layout data, and the lower image 72.

Figure 17:
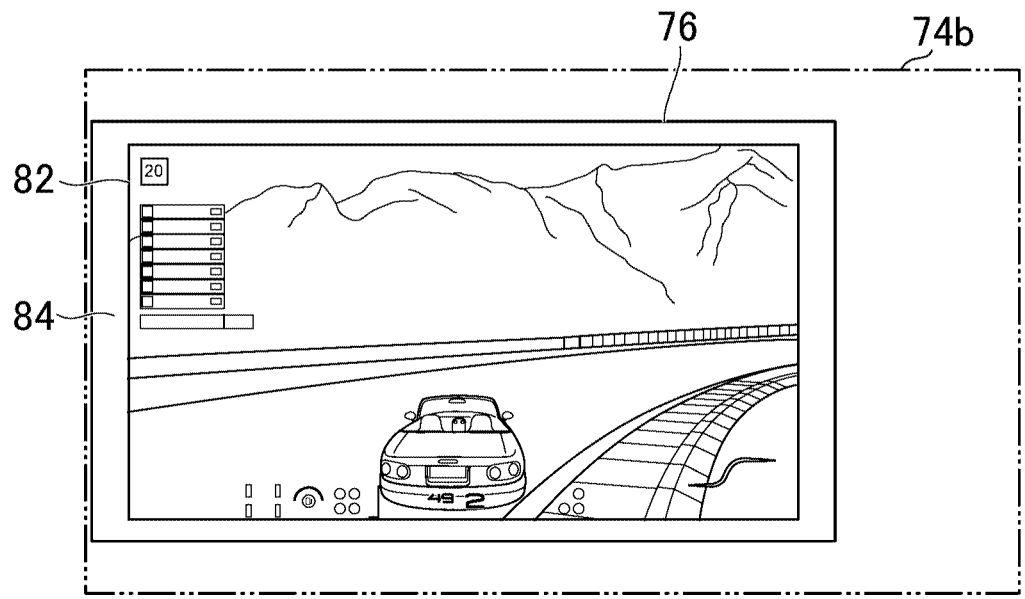
FIG. 17 is a diagram schematically illustrating an example placement of the lower image in the display target image.

FIG. 17 is a diagram schematically illustrating an example placement of the lower image 72 in the display target image 74b. As depicted in FIG. 17, in a case where the autoscaling process is performed, the lower image 72 may be placed in a content region 82 within the placement region 76, and pixels having a predetermined color, such as black, may be placed in a sash-shaped region 84 that is positioned outside the content region 82 and inside the placement region 76. If, for example, the percentage indicated by the safe area setting is 90% in the above instance, the content region 82 is set to have the same center position as the placement region 76 and sized to 90% of both the width and height of the placement region 76.

Further, the display target image 74*b* may be generated by performing the alpha blending process while the alpha value of the upper image 70 in the content region 82 is 0 and the alpha value of the upper image 70 outside the content region 82 is 1. In this instance, it is assumed as mentioned earlier that the alpha value 0 represents a transparent upper image 70, whereas the alpha value 1 represents an opaque upper image 70.

As described above, the present embodiment is configured such that, for example, the image generation section 48 places the lower image 72 having a given size at a given position in the display target image 74 irrespective of whether or not the autoscaling process is performed. For example, in a case where the autoscaling process is not performed, the lower image 72 is placed in the placement region 76. Meanwhile, in a case where the autoscaling process is performed, an image including the lower image 72 as a part is placed in the placement region 76.

Further, depending on whether or not the autoscaling process is performed, the image generation section 48 changes a region where the pixels of the lower image 72 in the display target image 74 are reflected. For example, in a case where the autoscaling process is not performed, the pixels of the lower image 72 are reflected in the placement region 76. Meanwhile, in a case where the autoscaling process is performed, the pixels of the lower image 72 are reflected in the content region, which is smaller than the placement region 76.

Performing the above-described processing makes it possible to properly generate the display target image 74 based on the safe area setting in PinP display without changing the layout data indicative of the position and size of an image corresponding to the lower image 72 in the display target image 74.

It should be noted that the present invention is not limited to the above-described embodiment.

Moreover, the foregoing specific character strings and numerical values and the specific character strings and numerical values in the accompanying drawings are merely illustrative and not restrictive, and the present invention is not limited to such character strings and numerical values.

The invention claimed is:

1. A display control apparatus comprising:
   circuitry configured to:
   acquire a first image in a first frame buffer drawn by an application program and a second image in a second frame buffer drawn by the application program;
   specify, for a display, a first setting of a first safe area for the first image based on a first setting instruction from the application program and a second setting of a second safe area for the second image based on a second setting instruction from the application program, the second setting being different from the first setting, wherein the first safe area is offset with respect to a center of the display;
   acquire, from the application program, an autoscaling setting for the first image that indicates whether or not an autoscaling process is to be applied to the first image based on a size of the first safe area;
   generate a display target image including superimposing the first image sized based on the first setting and the second image sized based on the second setting, wherein the first image having no autoscaling process is displayed in a placement region having a position and a size in the display target image and the first image having the autoscaling process and a non-content display region are displayed in the placement region having the position and the size in the display target image; and
   output the display target image to the display.

2. The display control apparatus according to claim 1, wherein the circuitry is configured to:
   generate the display target image that is obtained by superimposing the first image and the second image, the first image being drawn in the first frame buffer by a first application program as the application program, the second image being drawn in the second frame buffer by a second application program different than the first application program, as the application program, and
   change a region where pixels of the first image in the display target image are displayed within the placement region.

3. The display control apparatus according to claim 1, wherein one of the first setting and second settings maintains a size of a corresponding image.

4. The display control apparatus according to claim 1, wherein circuitry is configured to generate a non-display region outside the first safe area and the second safe area to be output with the display target image.

5. The display control apparatus according to claim 4, wherein pixels in the non-display region are set to a predetermined value.

6. The display control apparatus according to claim 4, wherein the non-display region surrounds the display target image on at least two sides.

7. The display control apparatus according to claim 6, wherein the non-display region surrounds the display target image on all sides.

8. The display control apparatus according to claim 1, wherein the second safe area includes a region outside the first safe area.

9. The display control apparatus according to claim 8, wherein the second image is positioned at a predetermined location in the region outside the first safe area relative to the first safe area.

10. The display control apparatus according to claim 1, wherein pixels in the non-content display region are set to a predetermined value.

11. A display control method comprising:
    acquiring a first image that is in a first frame buffer drawn by an application program and a second image in a second frame buffer drawn by the application program;
    specifying, for a display, a first setting of a first safe area for the first image based on a first setting instruction from the application program and a second setting of a second safe area for the second image based on a second setting instruction from the application program, the second setting being different from the first setting, wherein the first safe area is offset with respect to a center of the display;
    acquiring, from the application program, an autoscaling setting for the first image that indicates whether or not an autoscaling process is to be applied to the first image;
    generating a display target image by superimposing the first image sized according to the first setting and the second image sized according to the second setting, wherein the first image having no autoscaling process is displayed in a placement region having a position and a size in the display target image and the first image having the autoscaling process and a non-content display region are displayed in the placement region having the position and the size in the display target image; and outputting the display target image to the display.

12. The display control method according to claim 11, further comprising:
generating the display target image that is obtained by superimposing the first image and the second image, the first image being drawn in the first frame buffer by a first application program as the application program, the second image being drawn in the second frame buffer by a second application program different than the first application program, as the application program, and
changing a region where pixels of the first image in the display target image are displayed with the placement region.

13. The display control method according to claim 11, wherein one of the first setting and second settings maintains a size of a corresponding image.

14. The display control method according to claim 11, further comprising generating a non-display region outside the first safe area and the second safe area to be output with the display target image.

15. The display control method according to claim 14, further comprising setting pixels in the non-display region to a predetermined value.

16. The display control method according to claim 14, wherein the non-display region surrounds the display target image on at least two sides.

17. The display control method according to claim 16, wherein the non-display region surrounds the display target image on all sides.

18. The display control method according to claim 11, wherein the second safe area includes a region outside the first safe area.

19. The display control method according to claim 18, wherein the second image is positioned at a predetermined location in the region outside the first safe area relative to the first safe area.

20. A non-transitory computer readable medium having stored thereon a program executable by a computer, when executed by the computer, causes the computer to perform a method comprising:
acquiring a first image that is in a first frame buffer drawn by an application program and a second image in a second frame buffer drawn by the application program;
acquiring, from the application program, an autoscaling setting for the first image that indicates whether or not an autoscaling process is to be applied to the first image;
specifying, for a display, a first setting of a first safe area for the first image based on a first setting instruction from the application program and a second setting of a second safe area for the second image based on a second setting instruction from the application program, the second setting being different from the first setting, wherein the first safe area and the second safe area are spaced apart on the display;
generating a display target image by superimposing the first image sized based on the first setting and the second image sized based on the second setting, wherein the first image having no autoscaling process is displayed in a placement region having a position and a size in the display target image and the first image having the autoscaling process and a non-content display region are displayed in the placement region having the position and the size in the display target image; and
outputting the display target image to the display.

* * * * *